United States Patent [19]

Steward

[11] Patent Number: 4,900,086
[45] Date of Patent: Feb. 13, 1990

[54] INTEGRAL FOLDING CHILD RESTRAINT SYSTEM

[76] Inventor: Royce E. Steward, 2624 Corinth Ave., Los Angeles, Calif. 90064

[21] Appl. No.: 245,039

[22] Filed: Sep. 16, 1988

Related U.S. Application Data

[63] Continuation-in-part of Ser. No. 80,813, Aug. 3, 1987.

[51] Int. Cl.$^4$ .............................................. A47C 15/00
[52] U.S. Cl. ...................... 297/238; 297/14; 297/112; 297/438
[58] Field of Search ............... 297/238, 112, 113, 119, 297/115, 191, 14, 488

[56] References Cited

U.S. PATENT DOCUMENTS

| | | | |
|---|---|---|---|
| 1,692,930 | 11/1928 | Cummings | 297/14 |
| 2,436,294 | 2/1948 | Glastein | 297/238 X |
| 2,584,481 | 2/1952 | Mast et al. | 297/238 X |
| 3,094,354 | 6/1963 | Bernier | 297/112 |
| 3,951,450 | 4/1976 | Gambotti | 297/16 X |
| 4,533,176 | 8/1985 | Wyttenbach | 297/14 X |
| 4,540,216 | 9/1985 | Hassel, Sr. | 297/238 |
| 4,664,443 | 5/1987 | Casale | 297/488 X |

FOREIGN PATENT DOCUMENTS

| | | | |
|---|---|---|---|
| 2720954 | 12/1977 | Fed. Rep. of Germany | 297/238 |
| 131336 | 7/1985 | Japan | 297/238 |

Primary Examiner—Peter A. Aschenbrenner
Attorney, Agent, or Firm—Howard A. Kenyon

[57] ABSTRACT

A child restraint system which is an integral part of and folded into a land vehicle or aircraft adult seat is described. The integral child restraint system may be unfolded from the front portion of the back of an adult seat to form a comfortable child safety seat. A padded restraint bar also unfolds simultaneously with unfolding of the integral child safety seat to further restrain the child in the event of a crash. Also included is a belt restraint system, very similar to an approved portable child seat, attached to the child's safety seat frame. When the integral folding child safety seat is folded into its stored position, a normal padded passenger seat back is formed which is comfortable to an adult passenger sitting in the seat. A detachable tray fitted on the padded restraint bar is also included.

12 Claims, 3 Drawing Sheets

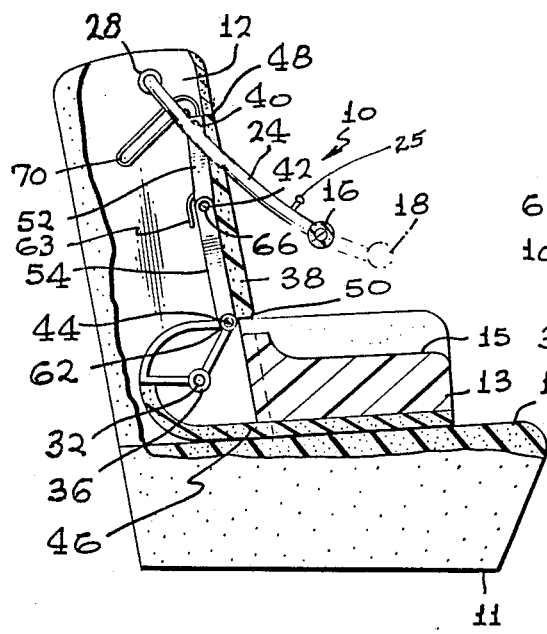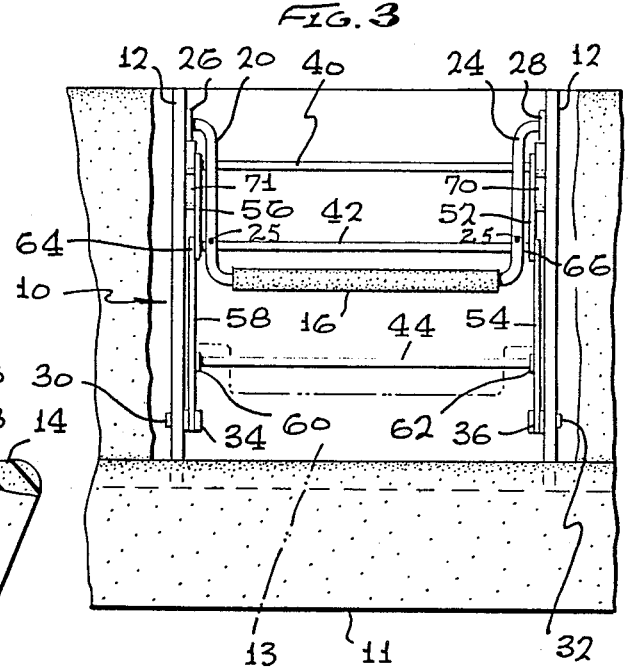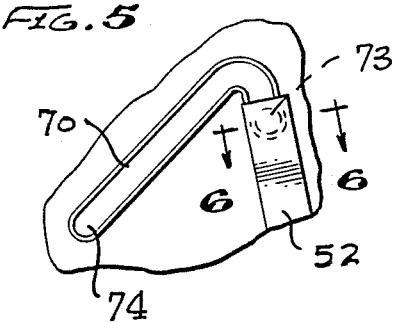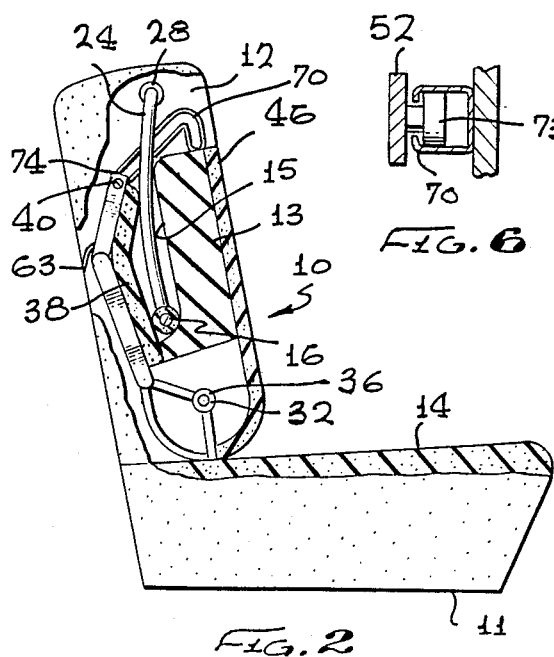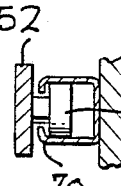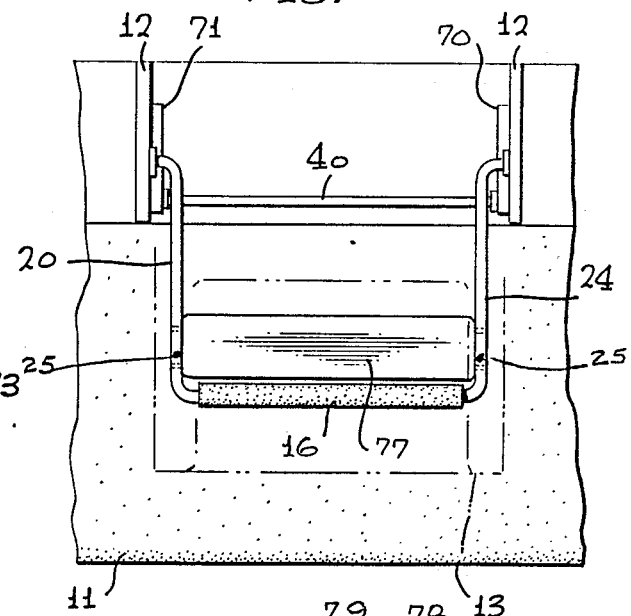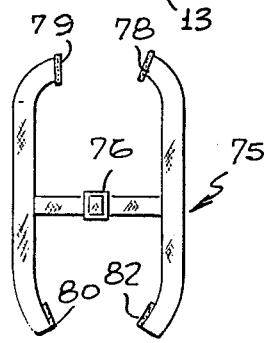

INTEGRAL FOLDING CHILD RESTRAINT SYSTEM

CROSS REFERENCE TO RELATED APPLICATION

This application is a continuation-in-part of application Ser. No. 080,813 filed Aug. 3, 1987.

BACKGROUND OF THE INVENTION

There are numerous portable child restraint systems available to the consumer, all of which depend on the seat belt of the automobile or aircraft to hold them in place. Even at best, a child restraint system that depends on the vehicle seat belt to protect the child in the event of a vehicle crash in no way can match the safety and reliability of a restraint system that is made an integral part of the vehicle seat frame. Many states have passed strict laws requiring young children to be in an approved child seat when traveling in a passenger automobile. However, there is no know state requirement for a child seat in a bus or aircraft. The present invention, since it is an integral part of a passenger seat back, can be placed in a bus or aircraft and when stored, provide a comfortable adult seat. At present, many airlines have no infant or child restraint system. If the infant is small, the mother and child buckle together. In case of a survivable crash, the mother's body would obviously crush the child against the seat belt. The present invention, when used in an airliner, would require a person to pay for a seat for an infant, but in a survivable crash, it would guarantee the infant would also have a chance to survive. In addition, if there are no requirements for an infant seat on the aircraft, the seat could be folded up and sold as an adult seat. The same logic would hold true for a bus vehicle. A number of inventors have recognized the advantage of having a child seat being attached to the vehicle. One such invention is U.S. Pat. No. 3,584,481 to G. M. Mast et. al. who describes a child's chair and a infant bed, neither of which have any restraining system. U.S. Pat. No. 3,951,450 to Gambotti claims a child seat folding into the back of the front seat of an automobile with the child riding backwards. U.S. Pat. No. 2,966,201 to Strahler describes a cradle folding into the back seat of an automobile, however, the seat being a removable block on which the child sits. U.S. Pat. No. 4,555,135 to Freeland describes a folding child seat that utilizes the seat bottom to form a seat in which the child rides backwards. pAll of the above patents have the limitation of only a single restraint system, while the present invention has a dual restraint system which is a safety harness and a restraint bar. In addition, the present child restraint system conforms to Federal Motor Vehicle Safety Standard No. 213, latest revision 8/30/84.

SUMMARY OF THE INVENTION

It is a primary objective of the present invention to provide a child restraint system which is an integral part of an adult seat on a vehicle such as an automoile.

It is another objective of the present invention to provide a comfortable child safety seat and padded restraint bar when the child restraint system is unfolded from the adult seat of a vehicle.

It is yet another objective of the present invention to provide a child restraint system that affords greater protection in the event of a crash than a portable child safety seat.

It is still another objective of the present invention to provide a child restraint system that, when folded, will produce a comfortable adult seat.

It is a further objective of the present invention to provide a child restraint system that does not utilize any space in the vehicle when in a folded position.

Briefly, in accordance with the invention, there is provided an integral folding child restraint system that is designed to fit and fold into the back portion of a vehicle seat. When folded, the portion where an adult's back would rest is padded and therefore will be as comfortable as the rest of the back portion of the vehicle seat. When the child safety seat is unfolded, simultaneously a padded restraint bar will unfold with the child safety seat whereby the padded restraint bar can be locked in its up position. The padded restraint bar side tubing has adjustable means and locking means to fit various child body forms. A removable plastic tray is also available that snaps on the restraint bar tubes to hold articles for the entertainment of the child. When unfolded, the child safety seat will rest on the vehicle's seat and the child will be riding in a forward position.

These and other objects, features and advantages of the present invention will become more readily apparent upon detailed consideration of the following description of a preferred embodiment with reference to the accompanying drawings.

BRIEF DESCRIPTION OF THE DRAWINGS

FIG. 1 shows a partial "cut away" view of the child restraint system in the unfolded position.

FIG. 2 shows a partial "cut away" view of the child restraint system in the folded position.

FIG. 3 is a front view showing the mechanism of the child restraint system.

FIG. 4 is a top view showing the removable tray fitted on the restraint bar.

FIG. 5 is an isolated section showing part of the mechanism of the child restraint system.

FIG. 6 is a cross section of the channel of part of the mechanism of the child restraint system taken on line 6—6 of FIG. 5.

FIG. 7 shows seat harness webbing which will attach to the child seat mounting frame.

Figure 8:
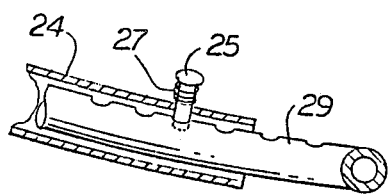
FIG. 8 shows the positioning and locking mechanism of the padded restraint bar.

The novel features which are believed to be characteristics of the invention, both as it's organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

DETAILED DESCRIPTION OF THE PREFERRED EMBODIMENT

Referring now in detail to the drawings wherein like parts designated by like reference numerals throughout, there is shown in FIG. 1 a partial cut away view of a child restraint system 10 fitted into an adult seat 11 having a child seat mounting frame 12 built into the back of the adult seat 11 mounted in a vehicle (not shown) with the child safety seat 13 pivotally mounted on each side of the child seat mounting frame 12. The integral child safety seat 13 can be built into either side of the adult seat 11 of a land vehicle such as an automobile which would provide room for an adult also to sit on the seat.

It is assumed that the adult seat will contain the required adult seat belts (not shown) which is standard on both an automobile and aircraft. The child safety seat 13, when open, rests on the adult seat bottom 14. A rump support 15 is provided on the child safety seat 13 as shown in FIG. 1 of the drawing. Frame 12 as seen in FIGS. 1, 2 and 3 is a metal plate that is fastened to the same structure (not shown) of the vehicle that holds the vehicle seat secured to the vehicle. The metal plate must be of sufficient strength to take the loads required in Federal Safety Standard No. 213 dated Dec. 13, 1979 with the latest revision being Aug. 30, 1984. The frame 12 can be bolted, welded or fastened to the structure of the vehicle in such a manner that will provide sufficient strength to withstand a survivable crash. The preferred method of fastening, however, is welding since the frame 12 will be an integral part of the vehicle and installed when the remainder of the structure is being initially assembled. The child safety seat 13 has all the members fastened to the mounting frame 12 as shown in FIGS. 1, 2 and 3. A padded restraint bar 16 is shown in its up and locked position with is extended position as 18. In order to provide room to seat a child in the safety seat 13, one may wish to put the restraint bar 16 at position 18. However, after the child is seated, the restraint bar 16 can be positioned closer to the child as shown in FIG. 1.

In order to accomplish this, the tubes 20 and 24 on each side of the padded restraint bar 16 are telescoping with a spring biased locking pin as shown in FIG. 8. In FIG. 8, pin 25 is held in a lock position by spring 27. When it is desired to change the position of the restraint bar 20 and 24, pins 25 are pulled outward against spring tension provided by springs 27 and the end of the restraint bar 29 shown in FIG. 8 is moved in or out as desired. It should be understood that the restraint bar 20 has the same mechanism, shown in FIG. 8, as 24 and therefore to move the restraint bar in and out, both pins 25 must be pulled up simultaneously. A number of positions for the restraint bar 16 are available to adjust to the different anatomies of children.

Figure 9:
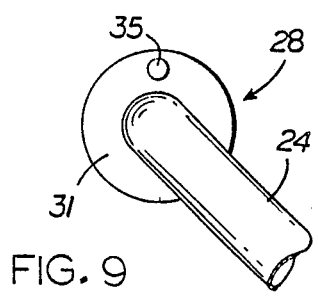
FIG. 9 is a side view of the pivot and locking mechanism of the padded restraint bar.
Figure 10:
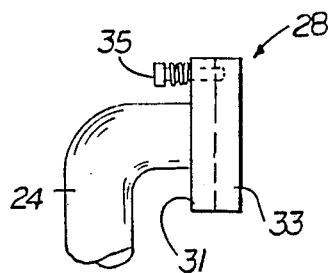
FIG. 10 is an end view of the pivot and locking mechanism of the padded restraint bar.

The pivot mechanism 26 and 28, as most clearly seen in FIG. 3, is a spring biased system that will lock the restraint bar 16 in is up position. As seen in FIGS. 9 and 10, the pivot mechanism 28 is divided into two parts 31 and 33. Part 31 rotates with the tube 24 while part 33 is fixed to plate 12. The pin 35 is spring biased such that when the restraint bar 16 is placed in the up position, the pin 35 will be forced by the spring into a hole in part 33. To release the restraint bar 16, a slight rotation pressure upward will allow the locking pin 35 to be manually released which will further allow the restraint bar 16 to be folded toward the position as described in FIG. 2.

Turning now to FIG. 2, there is seen the child safety seat 13 in is folded position. In order to accomplish this, the restraint bar 16 is released as described above and folded down against padded segment 38 of the seat back. The child safety seat 13 is then lifted off the surface of the adult seat 14 and rotated about pivot points 30 and 32.

Figure 13:
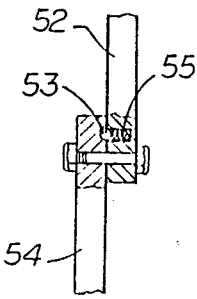
FIG. 13 shows the pivot and holding mechanism of the vertical child safety seat back member.
Figure 11:
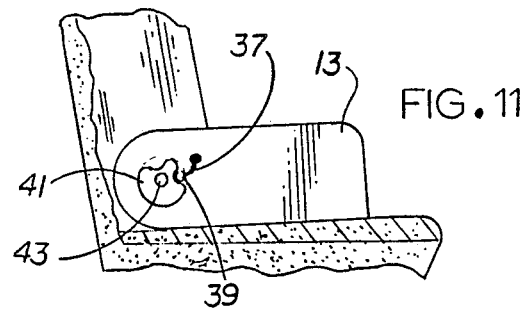
FIG. 11 shows the pivot and holding mechanism of the child safety seat in its down position.
Figure 12:
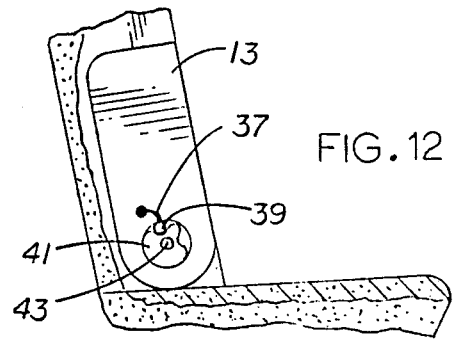
FIG. 12 shows the pivot and holding mechanism of the vertical child safety seat back member.

The mechanism 34 and 36 as best shown in FIG. 3 holds the seat 13 firmly in either the down or up position. The mechanism that accomplishes this is described in FIGS. 11 and 12. In FIGS. 11 and 12 a spring 37 fixed under tension and a roller 39 are attached to child safety seat 13. A cam 41 is fixed to plate 12 by rod 43. FIG. 11 shows the seat 13 in the down position with the roller 39 in a first detent in cam 41. FIG. 12 shows the seat 13 in its up position with the roller 39 in a second detent in cam 41. It can be seen that the roller 39 which is under tension from the spring 37 will hold seat 13 firm in either the up or down position. The padded restraint bar 16 does not lock in the down position as the seat 13 in the up position holds the restraint bar 16 securely in place. As seen in FIGS. 1 and 3 a padded portion of the child restraint system 38 is supported and attached preferably by fabric loops (not shown) to cross bars 40, 42 and 44 which is also part of the support mechanism pivotally supported by members 52 and 54. Pivot joint 66 as shown in FIG. 1 is a spring biased roller cam mechanism which is shown in FIG. 13. When the members 52 and 54 are in alignment as in FIG. 1, the roller ball 53 in FIG. 13 is forced by spring 55 in a detent in member 54 which provides a stiffening effect to members 52 and also 54. Padded segment 38 is also separated from the remainder of the adult passenger seat at points 48 and 50. The padded restraint bar is first folded down against the padded segment 38. The seat 13 is then raised which pushes vertically against members 54 and 52. This in turn places an upward force on rotating members 73, shown in FIG. 6, such that rotating member 73 can rise vertically in groove 70 as shown in FIG. 5. The rotating member 73 will reach the top of track 70 and continue around the corner as seat 13 continues to be lifted. Since the padded restraint bar 16 is resting against padded segment 38, further rotation of seat 13 will force the padded restraint bar 16 against padded segment 38 and cause pivot joint 66 to break inward as the roller ball 53 in FIG. 13 is forced out of the detent. Continued rotation of seat 13 will pull the rotating member 73 down in groove 70 toward the end of groove 70 which is designated as 74. It can be seen that the padded restraint bar 16 and the seat 13 are simultaneously folded into the cavity in the adult passenger seat. When completely stored, the roller 39 will fall into a detent in cam 41 as shown in FIG. 12. This will hold the seat firmly in place in is up position. When seat 13 is in its folded up position, pivot joint 66 contains another detent that roller ball 53 will fit into. This provides a stiffening effect of members 52 and 54 that allows the seat 13 to be unfolded. When unfolding the seat 13, rotating member 73 will therefore travel up groove 70, go around the corner at the top of groove 70 and as the seat 13 continues to rotate, rotating member 73 will move vertically downward to the end of groove 70. This movement, in turn, will make the members 54 and 52 be in a vertical position as shown in FIG. 1.

In view of the above movements, the unfolding of the seat 13, rotates mechanism 36 which is connected to members 54 and 52 and cause members 52 and 54 to continuously move from a folded position to an unfolded position. Since the padded segment 38 is attached to cross bars 40, 42 and 44 which, in turn, are connected to members 52 and 54, unfolding the seat 13 will simultaneously cause the padded segment 38 or back support to be unfolded. This action will also release padded bar 16 which can be lifted to its up and locked position. Folding member bracket 63 prevents the members 52 and 54 from moving too far forward when seat 13 moves down on the adult seat 14. It can be seen that the padded segment 38 gives a child a comfortable back rest when the child safety seat 13 is in is unfolded position. It can also be seen that the bottom 46 of seat 13 becomes the adult seat back rest when seat 13 is in its folded position. It can be seen from FIG. 3 that there are identical mechanisms on the other side from the one described above and shown in FIG. 1.

FIG. 3 shows a front section cut away and gives good detail of the arms and rods that provide pivotal support to the child restraint system.

FIG. 4 provides a top view of the child restraint system. This figure gives a top view of removable tray 77. Simple spring clips 57 are fitted over the tubular members 20 and 24 of the padded restraint bar 16 and hold the removable tray 77 in place. The removable tray is stored prior to folding of the child safety seat.

Figure 14:
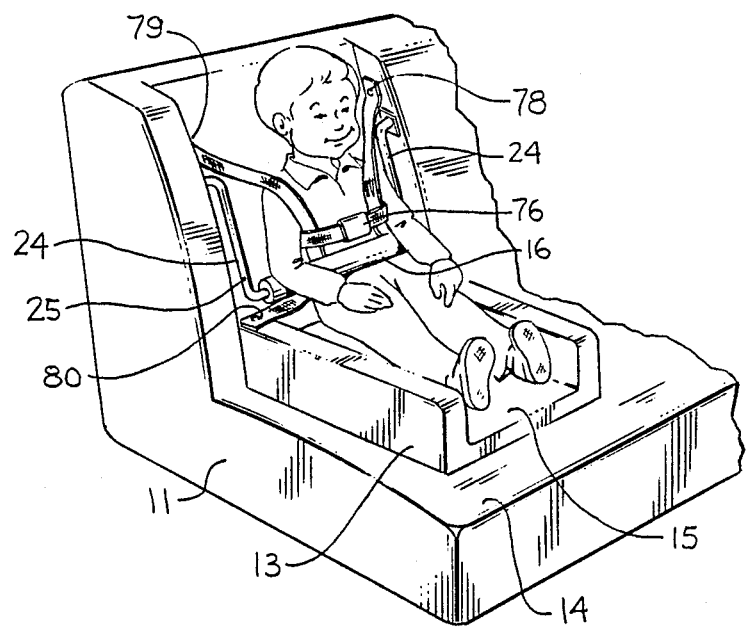
FIG. 14 is a perspective view of the child safety seat which also shows the restraint harness.

FIG. 7 shows a restraint harness made from strong webbing material. A quick release buckle 76 is provided in the event a person desires to move the child quickly to a safer area. The points on restraint harness 79 and 78 tie into the seat frame 12 of an adult 11 by attaching means. The points 80 and 82 tie into the child seat frame 12 by attaching means but at a lower point. The restraint harness 75 attached to frame 12 is shown in FIG. 14. When the child safety seat 13 is folded into its closed position, the restraint harness is tucked into the cavity formed by the rump support 15.

It is well known that a restraint system is mandatory if one is to survive a severe crash in either a land vehicle or aircraft. The child restraint system described by this invention provides maximum protection provided by a restraint system in a vehicle. The child seat 13 is attached to a seat frame 12 which is further attached to the adult seat 11 which is attached to the vehicle. A restraint bar 16 which can be adjusted against the child in addition to the restraint harness 75 will give protection even if the vehicle is in an upside down position. In addition, if the restraint bar 16, harness 75 and child seat 13 are in the folded position, a soft cushion layer 46 and the bottom of the child seat 13 will provide a comfortable back rest for an adult.

It is apparent that the construction of this invention provides for all the required safety features presently thought to be necessary in safe child seating for a land vehicle or aircraft. This is provided in a minimum space with a maximum of simplicity. In addition, the closure of the apparatus in the folded position is complete, giving the vehicle seat almost normal appearance and comfort.

Thus, it is apparent that there has been provided, in accordance with the invention, an integral folding child restraint system that fully satisfies the aims and objectives sat forth above. It is understood that all terms used herein are descriptive rather than limiting. While the invention has been described in conjunction with specific embodiments thereto, it is evident that may alternatives, modifications, and variations will be apparent to those skilled in the art in light of the aforegoing description.

Accordingly, it is intended to include all such alternatives, modifications, and variations that fall within the spirit and scope of the appended claims.

What is claimed is:

1. A child restraint system comprising:
    an adult seat mounted in a vehicle by a seat frame, said adult seat having a padded seat bottom and a padded seat back, and having an opening in said adult seat back;
    a child seat mounting frame made integral with said adult seat frame, said child seat mounting frame being set within said opening in said adult seat;
    a child seat pivotally mounted onto said child seat mounting frame, wherein said child seat will fold into said adult seat to form a comfortable, smooth, and flush area on said adult seat back;
    a back support for said child seat, said back support pivotally attached to said child mounting frame and pivotally attached in the middle of said back support such that said back support will fold inwardly when said child seat is folded into said adult seat;
    a rump support and a back support formed on said child seat and pivotally attached to said child seat mounting frame wherein the unfolding of said rump support will simultaneously cause the unfolding of said back support;
    a padded restraint bar pivotally attached to said child seat frame wherein said padded restraint bar is folded into said opening in said adult seat when said child seat is folded and is moved out of its folded position when said child seat and said back support are simultaneously unfolded;
    a restraining harness attached to said child seat mounting frame wherein said restraining harness restrains the shoulder portion of a child's anatomy.

2. A child restraint system as described in claim 1 wherein said folding child seat is held firm in its folded position by a spring biased roller in a detent in a cam attached to said seat.

3. A child restraint system as described in claim 1 wherein said folding child seat is held firm in its unfolded position by a spring biased roller in a detent in a cam attached to said seat.

4. A child restraint system as described in claim 1 wherein said padded restraint bar is locked in its up position by a spring biased pin fitting into a hole in a fixed plate attached to said frame.

5. A child restraint system as described in claim 4 wherein said padded restraint bar may be adjusted to conform to a child's body by telescoping tubes on each end of and perpendicular to said padded restraint bar.

6. A child restraint system as described in claim 4 wherein said telescoping tubes contain adjusting means and locking means to adjust and hold said padded restraint bar in any required position.

7. A child restraint system as described in claim 6 wherein said adjusting means and said locking means is by a spring biased pin fitted into a plurality of slots on the internal portion of said telescoping tubes.

8. A child restraint system as described in claim 1 wherein said padded restraint bar has a removable tray for toys and the like fitted on said tubes, said removable tray having spring clips fitted to said restraint bar arms.

9. A restraining harness as described in claim 1 wherein said harness has a quick release lock mechanism attached to a cross strap that is further attached to straps that restrain the shoulder portion of a child's anatomy, said restraint harness being further attached to said child seat mounting frame.

10. A child restraint system for a land vehicle or an aircraft comprising:

an adult seat mounted in a vehicle, said adult seat having a seat frame, a seat bottom, a seat back, and having an opening in said adult seat back;

a child seat mounting frame made integral with said adult seat frame, said child seat mounting frame being set within said opening in said adult seat, said child seat folding into said adult seat to form a comfortable and smooth area on said adult seat back;

a folding child seat pivotally mounted onto said child seat mounting frame;

a rump support formed on said child seat;

a back support for said child seat and pivotally attached to said child seat mounting frame, said back support folding inward in the middle of said back support when said child seat is folded into said adult seat;

a padded restraint bar pivotally attached to said child seat mounting frame;

a restraining harness attached to said child mounting frame.

11. A child restraint system as described in claim 10 wherein the unfolding of said child seat will simultaneously cause the unfolding of said back support for said child seat.

12. A child restraint system as described in claim 10 wherein said padded restraint bar is movable out of its folded position when said child seat and said back support are unfolded.

* * * * *